(12) United States Patent
Groll et al.

(10) Patent No.: US 9,498,084 B2
(45) Date of Patent: Nov. 22, 2016

(54) ONE-PIECE CARBON STEEL COOKWARE

(71) Applicant: All-Clad Metalcrafters LLC, Canonsburg, PA (US)

(72) Inventors: William A. Groll, McMurray, PA (US); John Watkins, Pittsburgh, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 0 days.

(21) Appl. No.: 14/253,259

(22) Filed: Apr. 15, 2014

(65) Prior Publication Data

US 2014/0339237 A1 Nov. 20, 2014

Related U.S. Application Data

(60) Provisional application No. 61/811,945, filed on Apr. 15, 2013.

(51) Int. Cl.
| | | |
|---|---|---|
| *B65D 25/28* | (2006.01) |
| *A47J 36/00* | (2006.01) |
| *A47J 27/00* | (2006.01) |
| *A47J 37/10* | (2006.01) |
| *A47J 45/06* | (2006.01) |
| *B21D 51/22* | (2006.01) |
| *A47J 36/02* | (2006.01) |

(52) U.S. Cl.
CPC ............... *A47J 37/10* (2013.01); *A47J 27/002* (2013.01); *A47J 36/02* (2013.01); *A47J 45/061* (2013.01); *B21D 51/22* (2013.01); *Y10T 29/4998* (2015.01)

(58) Field of Classification Search
CPC ........ A47J 37/10; A47J 45/061; A47J 36/02; A47J 37/002; B21D 51/22; Y10T 29/4998
USPC ....... 220/573.1, 753, 771, 769; 29/413, 463, 29/514, 525.06, 557, 527.1
See application file for complete search history.

(56) References Cited

U.S. PATENT DOCUMENTS

| | | | | | |
|---|---|---|---|---|---|
| 216,346 | A | * | 6/1879 | Read | 220/771 |
| 217,938 | A | * | 7/1879 | Graves | 220/771 |
| 1,014,342 | A | * | 1/1912 | Smith et al. | 220/752 |
| 1,499,670 | A | * | 7/1924 | Kuno | 220/753 |
| 2,283,019 | A | * | 5/1942 | Serr | 220/771 |
| 2,327,924 | A | * | 8/1943 | Mounts | 411/501 |
| 2,669,379 | A | * | 2/1954 | Olson | 220/574 |
| 4,049,187 | A | * | 9/1977 | Florian | 229/402 |
| 5,018,263 | A | * | 5/1991 | Stern | 29/469.5 |
| 5,174,965 | A | * | 12/1992 | Jones | B01L 3/508 215/396 |
| 6,186,395 | B1 | * | 2/2001 | Kennett | A47G 19/23 206/217 |
| 6,399,924 | B1 | * | 6/2002 | Cai | F24C 15/12 126/211 |
| 6,685,048 | B1 | * | 2/2004 | Ranzoni | A47J 45/061 220/759 |
| 2006/0243736 | A1 | * | 11/2006 | Kline et al. | 220/780 |

* cited by examiner

*Primary Examiner* — J. Gregory Pickett
*Assistant Examiner* — Niki M Eloshway
(74) *Attorney, Agent, or Firm* — The Webb Law Firm

(57) ABSTRACT

Cookware formed from carbon steel having a handle comprising two tangs cut from a peripheral flange surrounding a formed body of the cookware, such as a fry pan, wherein end portions of the tangs are integral with the formed body, the tangs being bent to form the handle configuration.

7 Claims, 9 Drawing Sheets

ONE-PIECE CARBON STEEL COOKWARE

CROSS REFERENCE TO RELATED APPLICATIONS

This application is a Continuation of provision U.S. Patent Application No. 61/811,945, filed on Apr. 15, 2013, of which is incorporated herein by reference in its entirety.

BACKGROUND OF THE INVENTION

Field of the Invention

The present invention relates generally to cookware and, more particularly, to a method of making a carbon steel cookware such as a fry pan with an integral handle or handles as well as to the cookware which is useful for cooking outdoors on a grill, for example.

Description of Related Art

It is well known to use carbon steel cookware when cooking food outdoors on a gas or charcoal grill due to the high temperatures involved in such outdoor cooking environments. It is known to form a pan-shaped object and separately forming one or more handles and then attaching the handles to the pan by rivets, for example.

SUMMARY OF THE INVENTION

Cookware preferably in the form of an outdoor fry pan and a method of making same are disclosed herein. A circular disc or blank of carbon steel is provided of a diameter of sufficient size to accommodate the forming of a fry pan, for example, with an integral handle(s). The blank diameter is sufficient to accommodate on its outer perimeter or flange sufficient material to form the integral handle or handles. The carbon steel disc-shaped blank is first drawn to form the body or pan shape of the fry pan or skillet. The outer perimeter flange of the drawn blank is then preferably laser cut to form the outline (in two dimensions) of opposed handle tangs. A remaining opposite portion of the flange may be laser cut to form an additional loop-type handle outline. The pre-cut tang portions of the blank are then bent upwardly and rearwardly and then bent toward each other to form a stick-type handle for the pan. The opposed handle tangs may then be secured together through pre-formed holes also formed by laser cutting and secured by rivets, for example, to provide the finished formed handle, integral with the fry pan body.

DETAILED DESCRIPTION OF THE INVENTION

Figure 1:
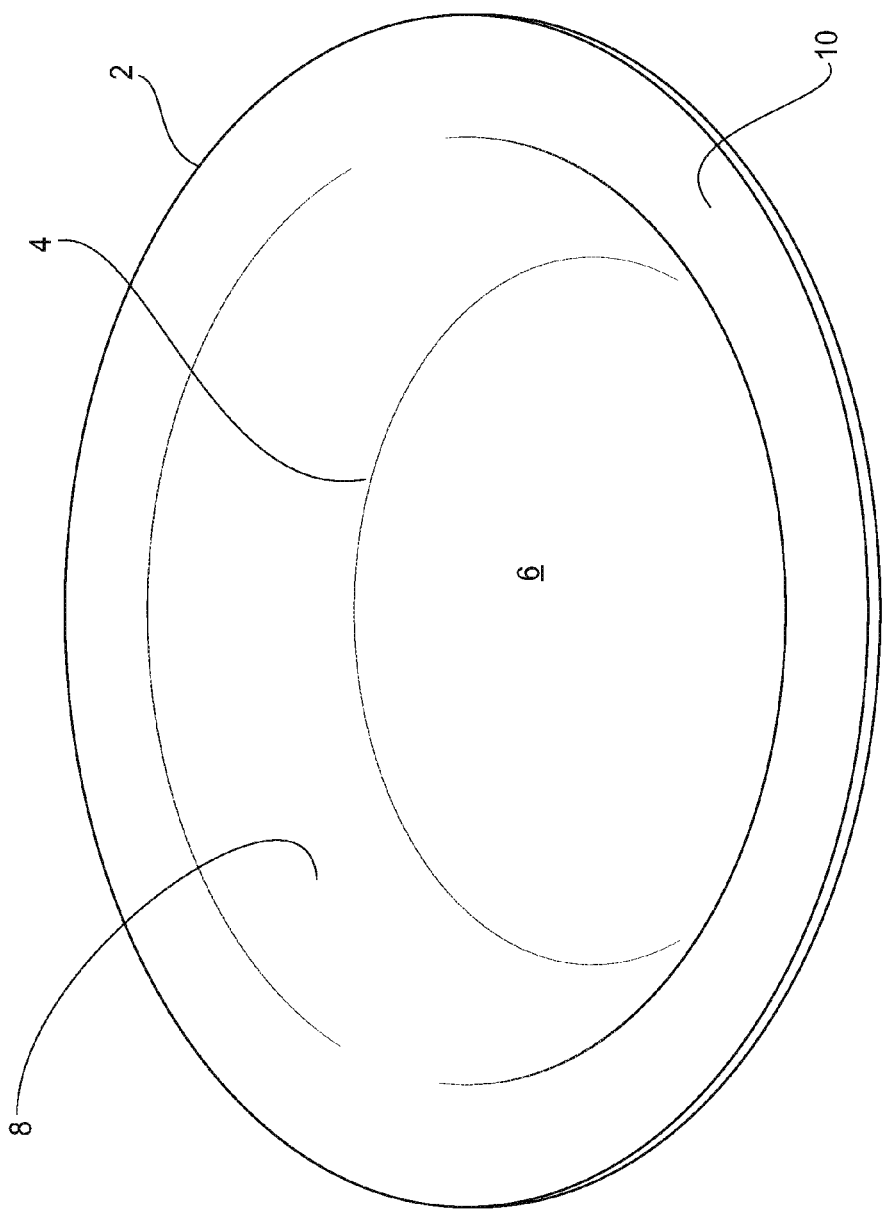
FIG. 1 is a perspective view of a drawn blank of carbon steel in the shape of a fry pan body having a peripheral flange integral therewith in accordance with step 1 of the present invention.
Figure 6:
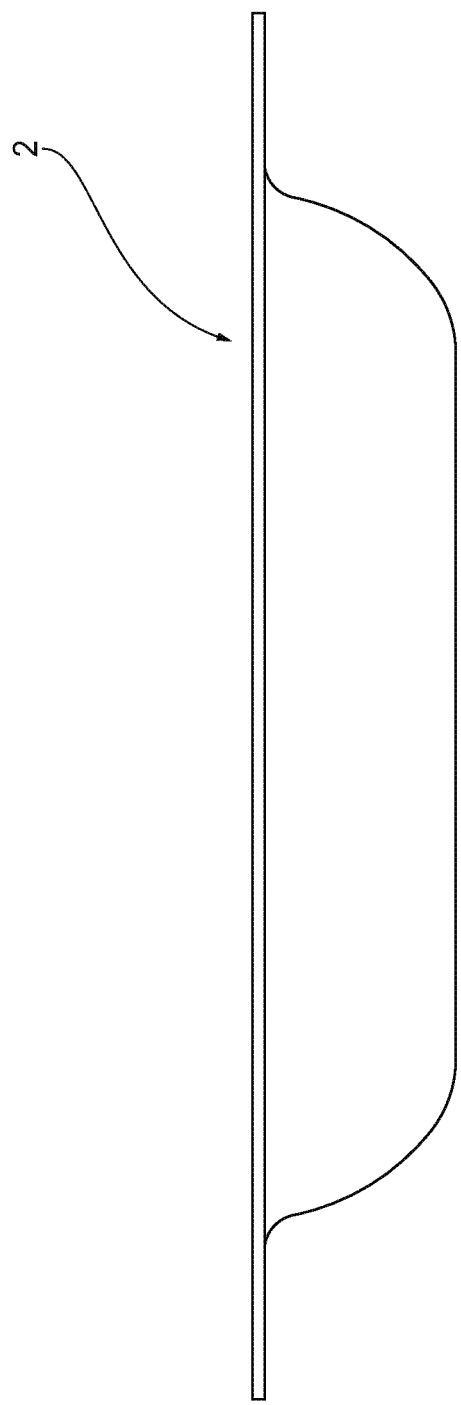
FIG. 6 is a side elevation view of the drawn blank of FIG. 1 with exemplary dimensions.

With reference to the drawings, a drawn blank 2 is shown in FIG. 1 and FIG. 6. In this first step, the round blank is drawn in a press, for example, for forming a fry pan body 4. The body 4 comprises a flat bottom wall defining a cooking surface 6 of the fry pan with integral sidewall 8 flaring upwardly therefrom. The outer perimeter of the drawn blank 2 carries an outwardly extending flange 10 on its perimeter. The drawn blank 2 is preferably made from carbon steel of a thickness between 0.080 and 0.125 inch in thickness. A nominal thickness of about 0.10 inch is found to be acceptable.

Figure 2:
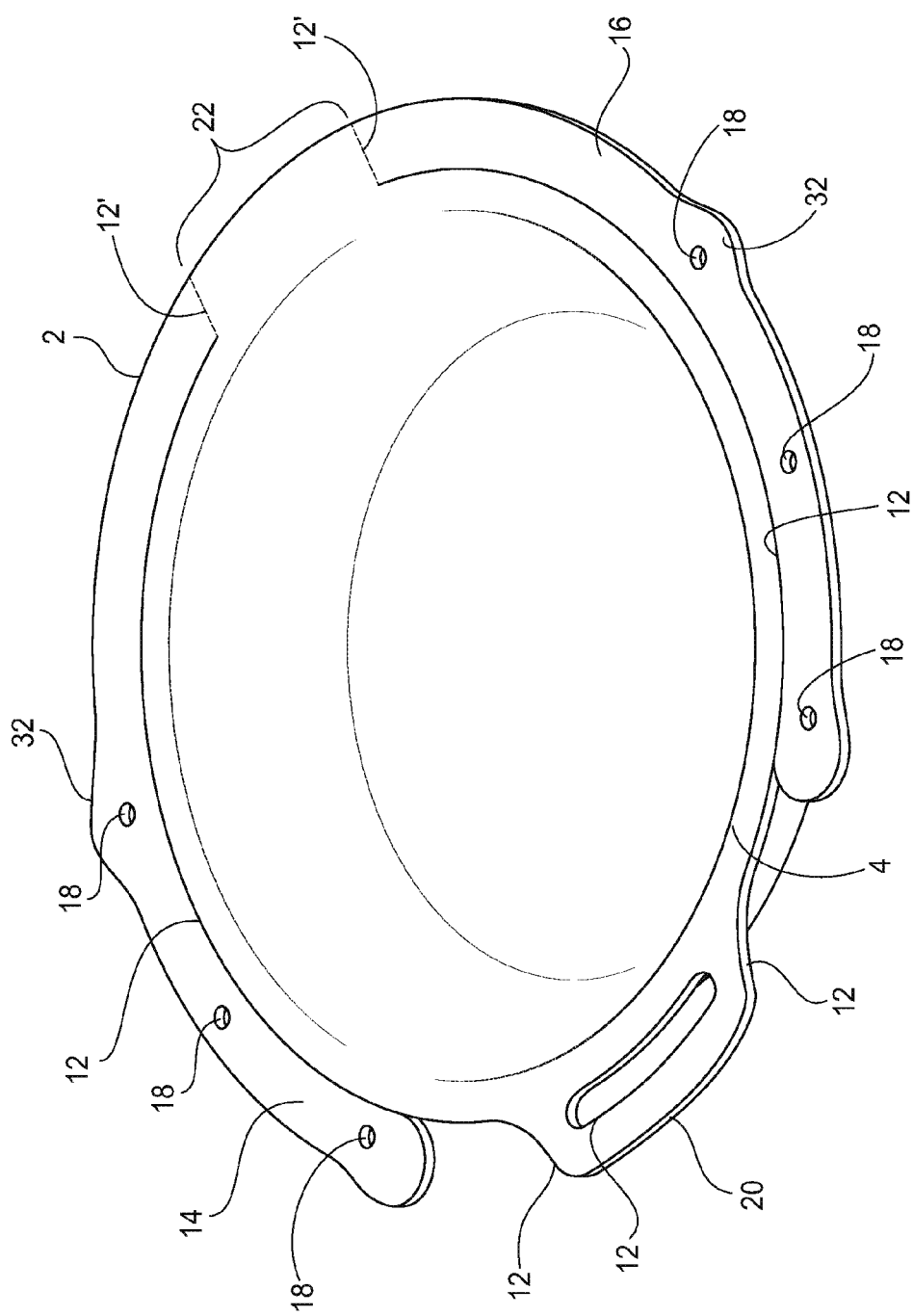
FIG. 2 is a perspective view of the drawn blank of FIG. 1 showing a laser cut pattern along the flange thereof according to the present invention.

With reference to FIG. 2, the drawn blank 2 is next subjected to a second step for laser cutting of the flange 10. Laser cut lines 12 are formed through the flange 10 to form a first handle tang 14 on one side of the fry pan body 4 and a second handle tang 16 formed on the other side. Holes 18 are also laser cut through the handle tangs. A loop handle 20 is also laser cut from the flange. Scribed lines 12' are also formed at ends of the handle tangs which provide a guide for bending the handle tangs 14 and 16, which will be described hereinafter. The scribed lines 12' define a solid region of the flange identified as 22 which will remain on the fry pan to connect with the ends of the handle tangs 14 and 16.

Alternatively, the drawn blank and blank cutting operations may be combined in a single step by a hydro forming operation such as a so-called "flow down" hydro forming step, wherein the drawing and cutting of the blank are carried out together.

Figure 3:
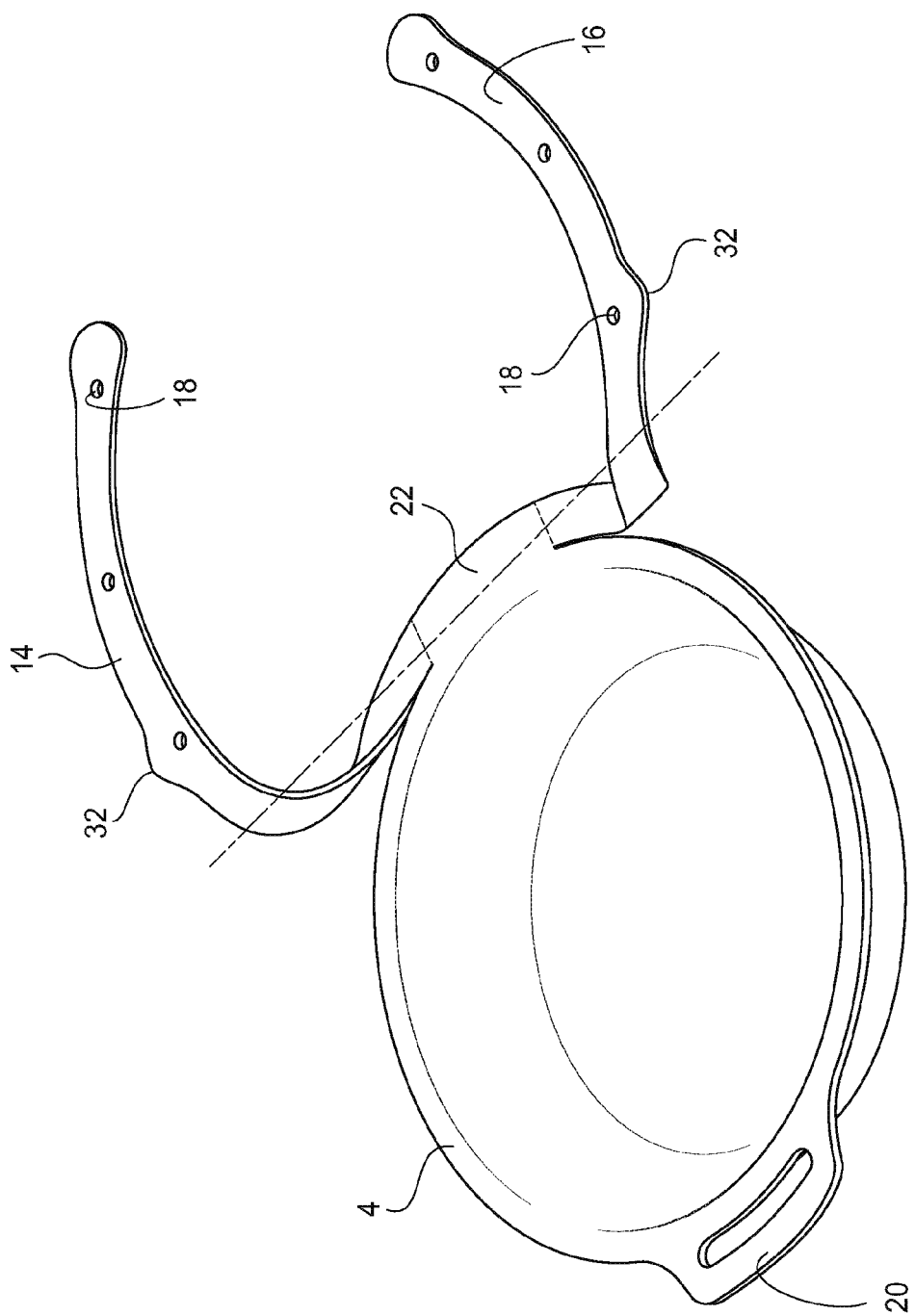
FIG. 3 is a perspective view showing a 180° bend of the handle tangs as previously pre-cut in FIG. 2.

Step 3 in the forming operation is shown in FIG. 3 in which the handle tangs 14 and 16 are bent at an angle of approximately 180° rearwardly of the fry pan body 4.

Figure 4:
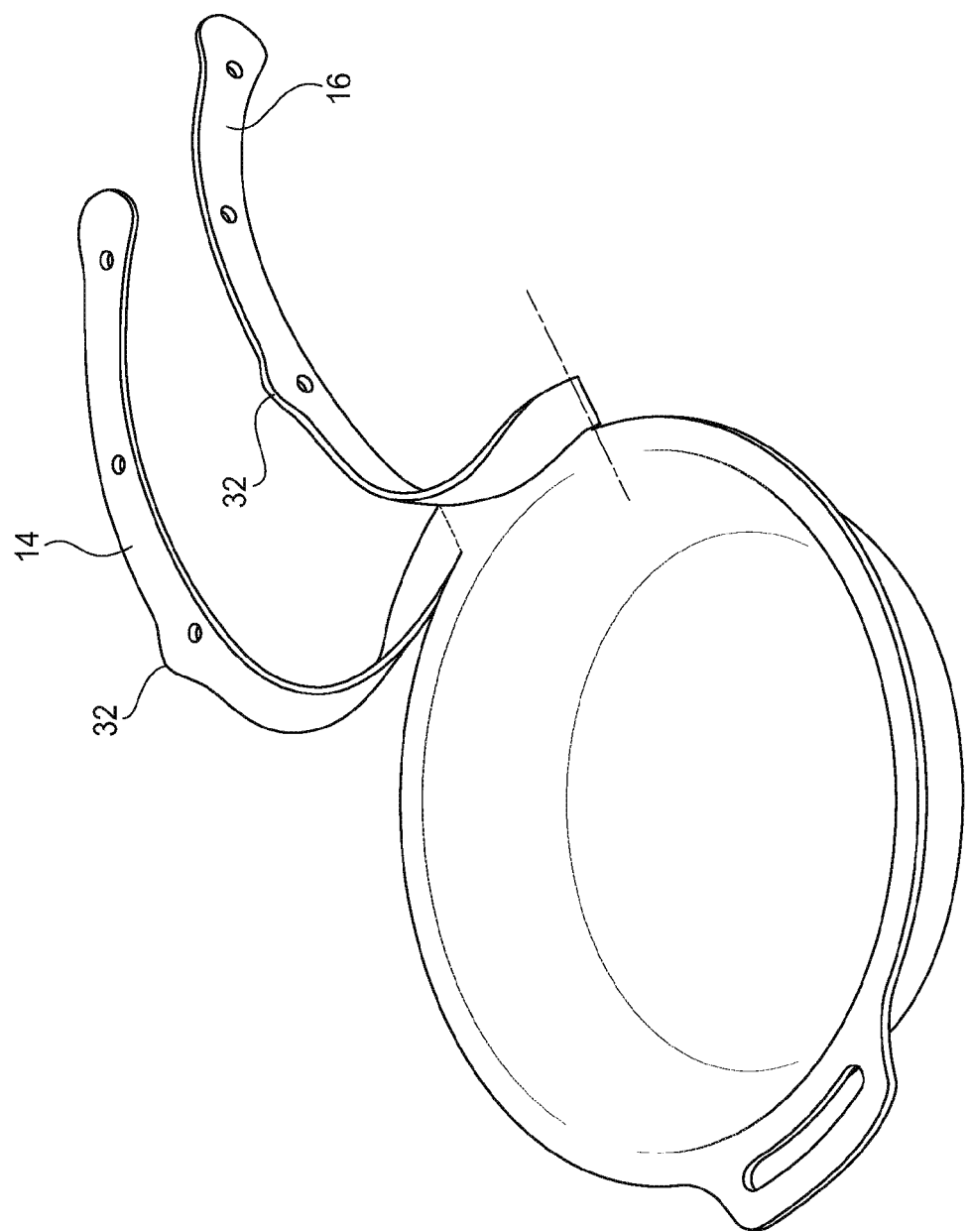
FIG. 4 is a perspective view showing one of the handle tangs bent at 90° on one side of the fry pan according to the present invention.

Step 4 in the forming operation is shown in FIG. 4 which shows handle tang 16 being bent on one side of the fry pan body upwardly at a 90° bend.

Figure 5:
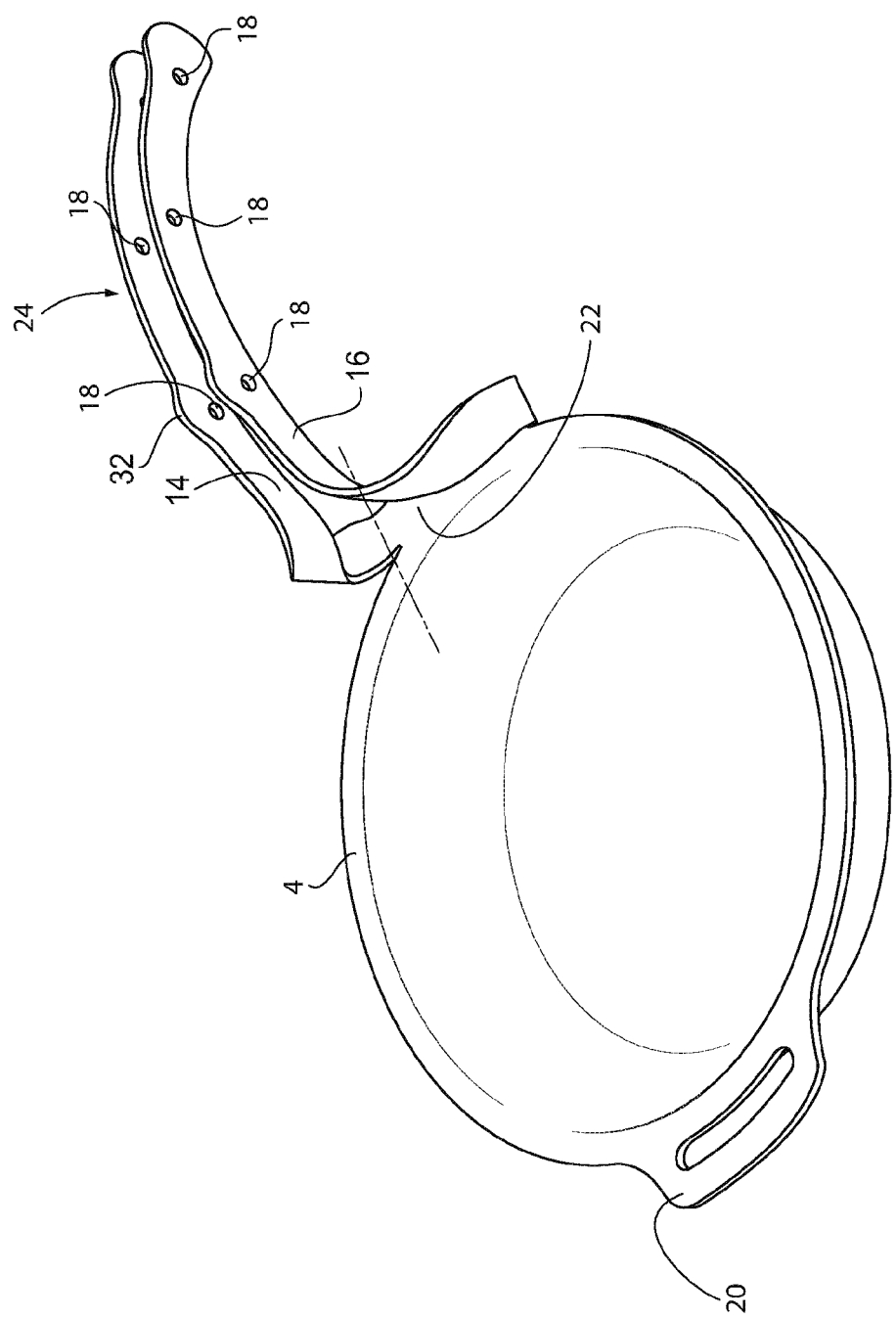
FIG. 5 is a perspective view showing the handle tang on the other side being bent at 90°.

FIG. 5 shows the opposed handle tang 14 being bent upwardly at 90° to match that of handle tang 16. The formed handle, designated by numeral 24, is shown in its completed shape in FIG. 5. To complete the handle 24, rivets or the like (not shown) are inserted through the matching holes 18 formed in the respective tangs 14 and 16 to join the handle tangs in a spaced-apart relationship. As seen in FIG. 5, the solid portion 22 which was uncut from the flange 10 is integrally connected to the respective handle tangs 14 and 16 to firmly and securely hold the handle 24 to the fry pan body 4.

Figure 7:
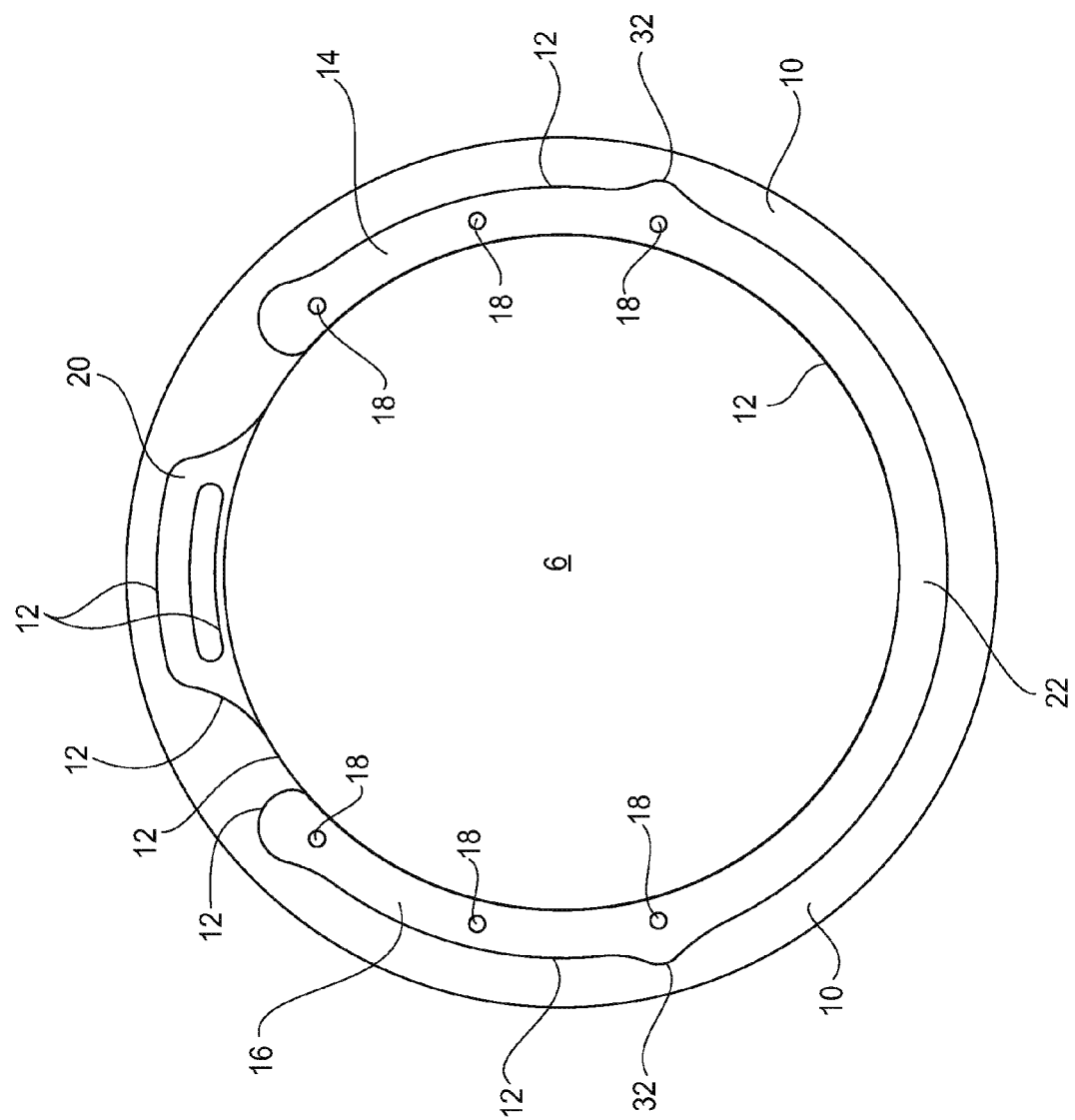
FIG. 7 is a plan view of the laser cut drawn blank of FIG. 2.

The plan view of the drawn blank 2 depicted in FIG. 7 shows in greater detail the laser cut lines 12 used in forming the handle tangs 14 and 16 from the flange 10. As can be appreciated from FIG. 7 as well as the remaining figures, the material usage in the manufacture of the fry pan of the present invention is quite efficient in that relatively little scrap is generated because the handles are integral with the body of the fry pan.

Figure 8:
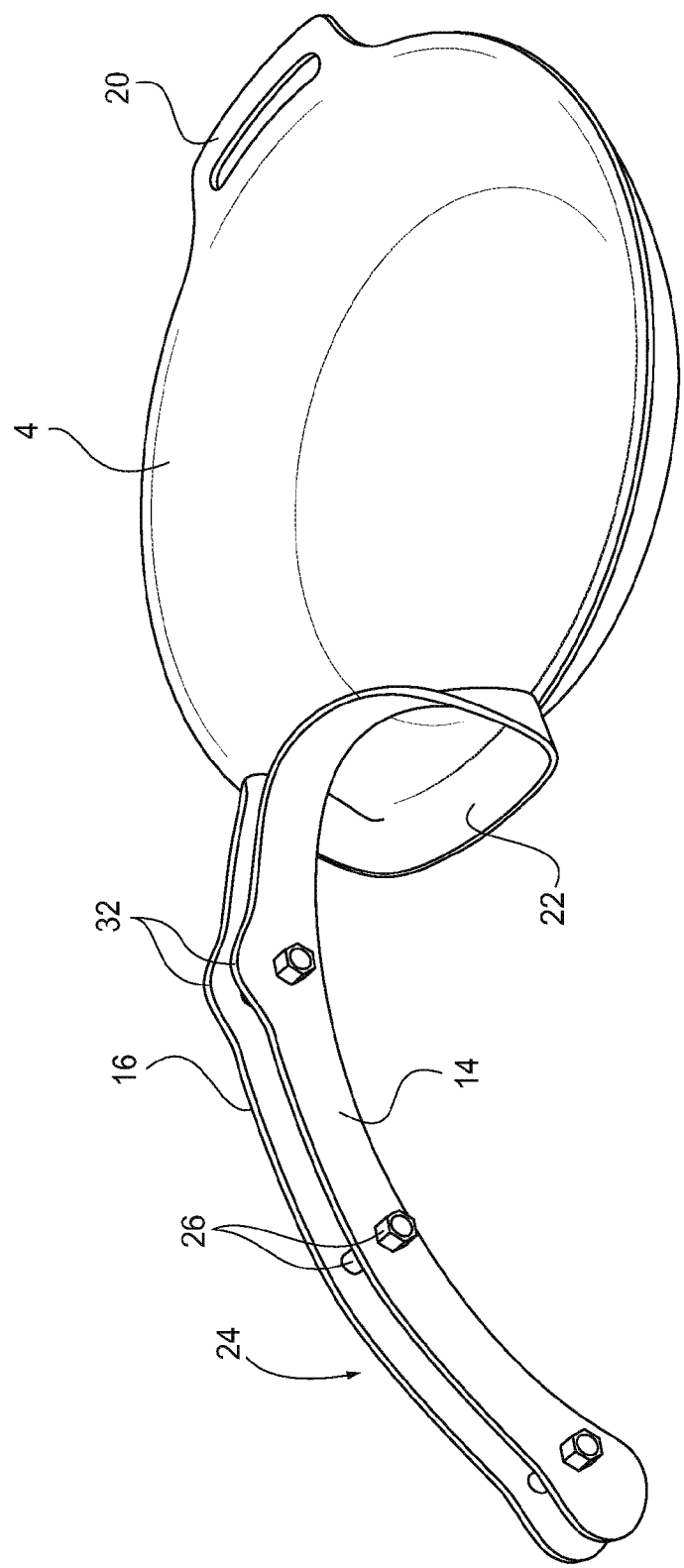
FIG. 8 is a photograph in perspective of an embodiment of the fry pan according to the invention.
Figure 9:
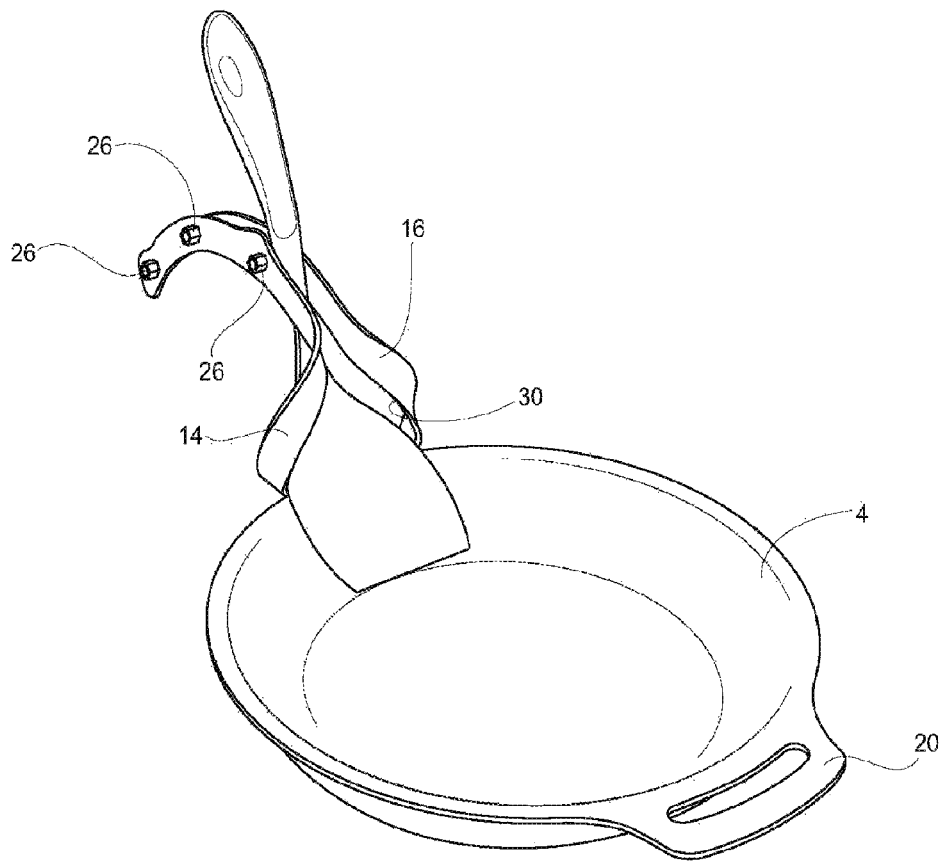
FIG. 9 is a photograph of a presently preferred embodiment of the present invention showing a cooking tool resting in the handle thereof.

FIGS. 8 and 9 show the fry pan of the present invention in a completed state with the handle rivets 26 or like fasteners in place on the finished handle 24.

As seen in FIG. 9, the handle tangs 14 and 16 in the bent formed position define an opening 30 therebetween which provides for a convenient nesting area for a cooking tool for use during cooking.

As shown in a number of the drawing figures, such as FIGS. 2, 3, 4, 5, and 7, an outwardly extending protruding portion 32 is laser cut on each of the handle tangs 14 and 16. As shown in the formed handle 24, as in FIGS. 5 and 8, these outwardly protruding portions 32 form a convenient guide portion for the user when gripping the handle to engage the user's thumb. In this manner, the user's hand will remain a safe distance from the hot fry pan body. We have also noted, in use, that the solid portion 22 between the handle tangs 14 and 16 acts as a heat shield to deflect radiant heat from the cooking fire flames away from the handle 24 to prevent it from getting too hot. The thin handle tangs extending upwardly from the top of the pan also tend to remain cooler due to its configuration and also due to the fact that there is an air gap between the two spaced-apart tangs providing a cooling effect on each of the handle tangs. The spacer rivets 26 between the handle tangs contribute to this effect.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A cookware formed from a one-piece circular blank of carbon steel, the cookware comprising:
   a formed body having a peripheral flange surrounding the formed body,
   a handle comprising two tangs, each tang having a first end and a second end, wherein the first end is monolithically formed on the peripheral flange surrounding the formed body of the cookware and separable from the peripheral flange, and wherein end portions of the second ends of the tangs are integral with the peripheral flange surrounding the formed body, the first ends of the tangs being permanently bent from the peripheral flange and joined together to form a handle configuration such that the two tangs are oriented in a substantially perpendicular orientation relative to a cooking surface of the formed body, and
   a heat shield defined by a portion of the peripheral flange between the second ends of the two tangs.

2. The cookware of claim 1 in the form of a fry pan or skillet useful for cooking outdoors.

3. The cookware of claim 1, further comprising one or more holes extending through each of the tangs.

4. The cookware of claim 3, wherein a fastener is inserted through each of the one or more holes to join the tangs in a spaced-apart relationship.

5. The cookware of claim 1, wherein each of the tangs has a radially outwardly protruding portion between the first end and the second end.

6. A method of making outdoor cookware comprising the steps of:
   (1) forming a drawn blank from a circular disc of carbon steel wherein the formed blank contains a central fry pan body surrounded by a peripheral flange;
   (2) cutting selected portions of the flange to form at least two curved handle tangs, having a web of uncut flange material between end portions of the handle tangs;
   (3) bending the handle tangs about 180° rearwardly of the fry pan body;
   (4) bending the handle tangs upwardly about 90° to cause the tangs to have lateral surfaces to face one another in a spaced-apart relationship; and
   (5) joining the handle tangs together as by rivets to maintain the spaced-apart relationship.

7. The method of claim 6, wherein cutting selected portions of the flange comprises laser cutting selected portion of the flange.

\* \* \* \* \*